US009203715B1

(12) United States Patent
Gabrielson et al.

(10) Patent No.: US 9,203,715 B1
(45) Date of Patent: *Dec. 1, 2015

(54) MANAGING HOST COMPUTING DEVICES (71) Applicant: Amazon Technologies, Inc., Seattle, WA (US)

(72) Inventors: Jacob Gabrielson, Seattle, WA (US); Marvin M. Theimer, Bellevue, WA (US); Allan H. Vermeulen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,785

(22) Filed: Sep. 29, 2014

Related U.S. Application Data (63) Continuation of application No. 13/250,201, filed on Sep. 30, 2011, now Pat. No. 8,849,995.

(51) Int. Cl.
*G06F 15/173* (2006.01)
*H04L 12/26* (2006.01)
*G06F 11/30* (2006.01)

(52) U.S. Cl.
CPC ........ *H04L 43/0811* (2013.01); *G06F 11/3062* (2013.01); *H04L 43/0876* (2013.01)

(58) Field of Classification Search
USPC ................................................. 709/223, 224
See application file for complete search history.

(56) References Cited

U.S. PATENT DOCUMENTS

| 6,651,190 | B1 * | 11/2003 | Worley et al. | 714/43 |
|---|---|---|---|---|
| 6,728,781 | B1 * | 4/2004 | Aguilera et al. | 709/240 |
| 7,058,826 | B2 * | 6/2006 | Fung | 713/300 |
| 7,107,313 | B2 * | 9/2006 | Fleming | 709/205 |
| 7,487,244 | B2 * | 2/2009 | Jacobs et al. | 709/226 |
| 7,555,516 | B2 * | 6/2009 | Lamport | 709/201 |
| 7,558,883 | B1 * | 7/2009 | Lamport | 709/248 |
| 7,565,433 | B1 * | 7/2009 | Lamport | 709/227 |
| 7,620,680 | B1 * | 11/2009 | Lamport | 709/201 |
| 7,644,087 | B2 * | 1/2010 | Barkai et al. | 707/770 |
| 7,698,465 | B2 * | 4/2010 | Lamport | 709/245 |
| 7,707,248 | B2 * | 4/2010 | Simard et al. | 709/204 |

(Continued)

OTHER PUBLICATIONS

Lamport, Leslie. (1978). Time, clocks, and the ordering of events in a distributed system. Communications of the ACM, 21(7), 558-565.

*Primary Examiner* — Kristie Shingles
*Assistant Examiner* — Timothy Sowa
(74) *Attorney, Agent, or Firm* — Knobbe, Martens, Olson & Bear, LLP (57) ABSTRACT

Systems and methods are disclosed which facilitate the management of host computing devices through the utilization of a host computing device control component. The host computing device control component includes a state monitoring component that monitors operating states of the control component and a group of associated host computing devices. The state monitoring component includes a power supply separate from the control component power supply, a state processing component, a visual indicator interface, and a separate communication component to facilitate communication with other state monitoring components. Utilizing consensus type algorithms, the state monitoring components can decide information related to the set of host computing devices, such as a state monitoring component authoritative for the grouping of the host computing devices.

20 Claims, 10 Drawing Sheets

(56) References Cited

U.S. PATENT DOCUMENTS

| | | | |
|---|---|---|---|
| 7,711,825 B2* | 5/2010 | Lamport | 709/227 |
| 7,797,457 B2* | 9/2010 | Lamport | 709/248 |
| 7,856,502 B2* | 12/2010 | Lamport et al. | 709/227 |
| 7,921,424 B2* | 4/2011 | Shutt et al. | 718/105 |
| 7,937,482 B1* | 5/2011 | Vermeulen et al. | 709/229 |
| 7,987,223 B2* | 7/2011 | Garnett et al. | 718/100 |
| 8,005,888 B2* | 8/2011 | Lamport | 709/201 |
| 8,073,897 B2* | 12/2011 | Lamport | 709/201 |
| 2008/0098256 A1* | 4/2008 | Halpern | 714/4 |
| 2009/0012804 A1* | 1/2009 | Read | 705/1 |
| 2011/0022574 A1* | 1/2011 | Hansen | 707/698 |
| 2012/0254287 A1* | 10/2012 | Watanabe | 709/202 |

* cited by examiner

MANAGING HOST COMPUTING DEVICES

This application is a continuation of U.S. patent application Ser. No. 13/250,201, entitled "MANAGING HOST COMPUTING DEVICES" filed Sep. 30, 2011, the disclosure of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. Each single physical computing device can be generally referred to as a host computing device. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In conjunction with the utilization of virtualization technologies, data centers can physically organize sets of host computing devices to allow the host computing devices to share computing device resources, such as power or communication network connectivity. Such physical organization can correspond to physical racks in which the hosting computing devices are mounted, generally referred to as racks of host computing devices. As the number of racks of host computing devices increases, service providers associated with data centers have difficulty distinguishing between errors or faults associated with individual host computing devices, shared resources associated with a particular rack or distributed components utilized to manage the host computing devices. Additionally, in some scenarios, service providers may maintain multiple data centers. In such scenarios, the service providers would benefit from the determination of the availability of multiple data centers and the inter-data center synchronization of state information.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of host computing devices. Specifically, systems and methods are disclosed which facilitate the management of host computing devices through the utilization of a host computing device control component, or control component. A set of host computing devices can be organized into a logical grouping of host computing devices, such as corresponding to host computing devices in a physical rack or host computing devices within a data center. Additionally, a host computing device control component is associated with each logical grouping. In one aspect, the host computing device control component is in communication with the set of host computing devices to monitor performance or manage the operation of various aspects of the host computing devices in the corresponding rack. In another aspect, the control component includes a separate state monitoring component that monitors operating states of the control component and manages events associated with one or more the host computing devices. The state monitoring component includes a power supply separate from the control component power supply, a state processing component, a visual indicator interface, and a separate communication component to facilitate communication with other state monitoring components. Utilizing consensus type algorithms, the state monitoring components can decide information related to the set of host computing devices by agreement as to either the condition of the grouping of host computing devices or the designation of a state monitoring component authoritative for the grouping of host computing devices.

Figure 1:
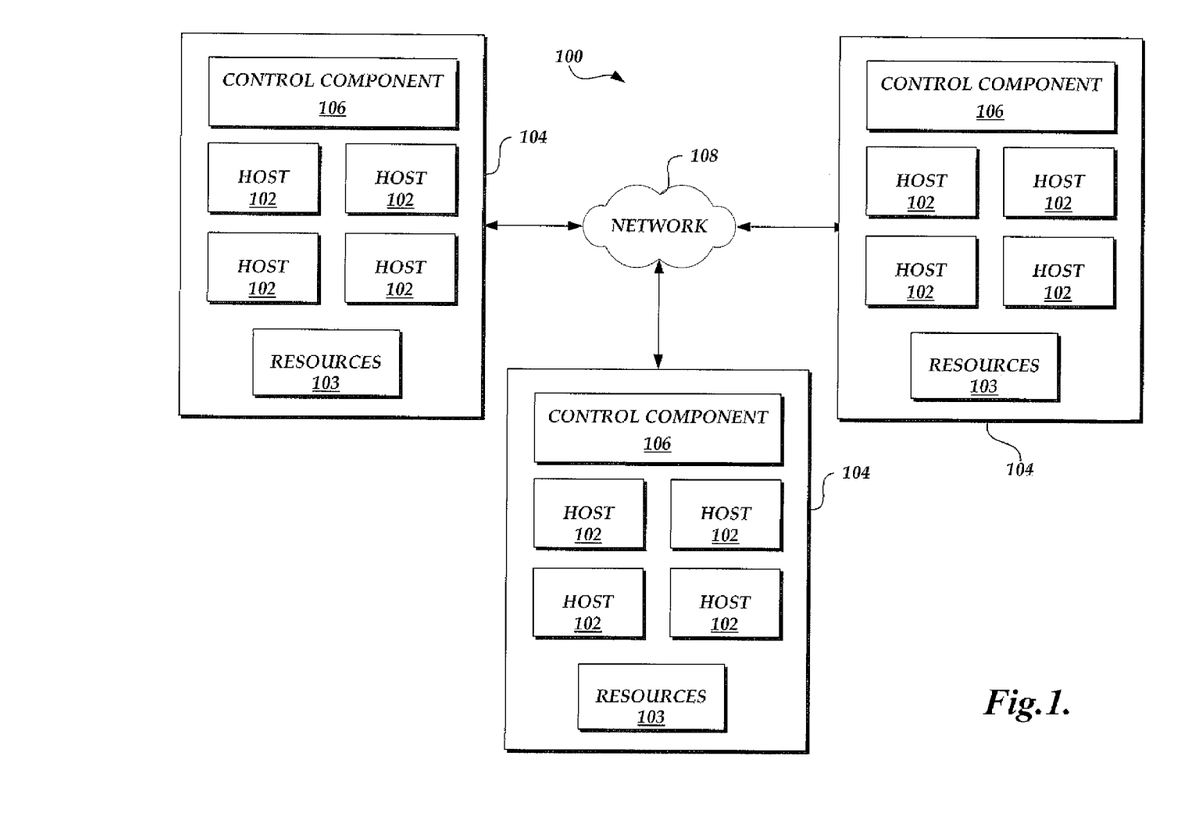
FIG. 1 is a block diagram depicting an illustrative environment for managing host computing devices including a number of host computing devices and control components.

With reference now to FIG. 1, a block diagram depicting an illustrative host computing device environment 100 for managing host computing devices will be described. The host computing device environment 100 includes a plurality of host computing devices 102. Illustratively, the host computing devices 102 correspond to server computing device having one or more processors, memory, operating system and software applications that can be configured for a variety of purposes. Additionally, the host computing devices 102 may be configure to host one or more virtual machine instances. As illustrated in FIG. 1, the plurality of host computing devices 102 are organized according to a physical placement of a set of host computing devices, such as a rack or other support structure. The organization of each set of host computing devices 102 will be generally referred to as a rack 104. However, a grouping of host computing devices 102 can correspond to other structures or physical criteria as well as non-physical criteria.

In an illustrative embodiment, each rack 104 is associated with a host computing device control component 106, which can also be referred to as a rack control component. In an illustrative embodiment, a host computing device control component 106 can manage the operation of the set of host computing devices 102, or components thereof, including, but not limited to provisioning, updating, monitoring, and modifying software associated with the host computing devices. The host computing device control component 106 also includes a state monitoring component for monitoring the state of the operation of the host computing device control component 106 and providing visual indicators corresponding to the determined state of operation. Illustrative components of the host computing device control component 106 will be described with regard to FIG. 2. Additionally, the racks 104 can also be associated with one or more common computing resources 103, such as power sources, communication networks, and the like.

As illustrated in FIG. 1, the multiple racks 104 of host computing devices 102 may communicate via a communication network 108, such as a private or public network. For example, host computing device control components 106 from each rack 104 may be able to communicate with each other via the communication network 108, which can include a private communication network specific to host computing device control components. One skilled in the relevant art will appreciate that each rack 104 may include any number of host computing devices 102 and that the host computing device environment 100 can include any number of racks 104. Still further, the racks 104 may be further organized in a manner that does not require connectivity between all the racks in the host computing device environment.

Figure 2:
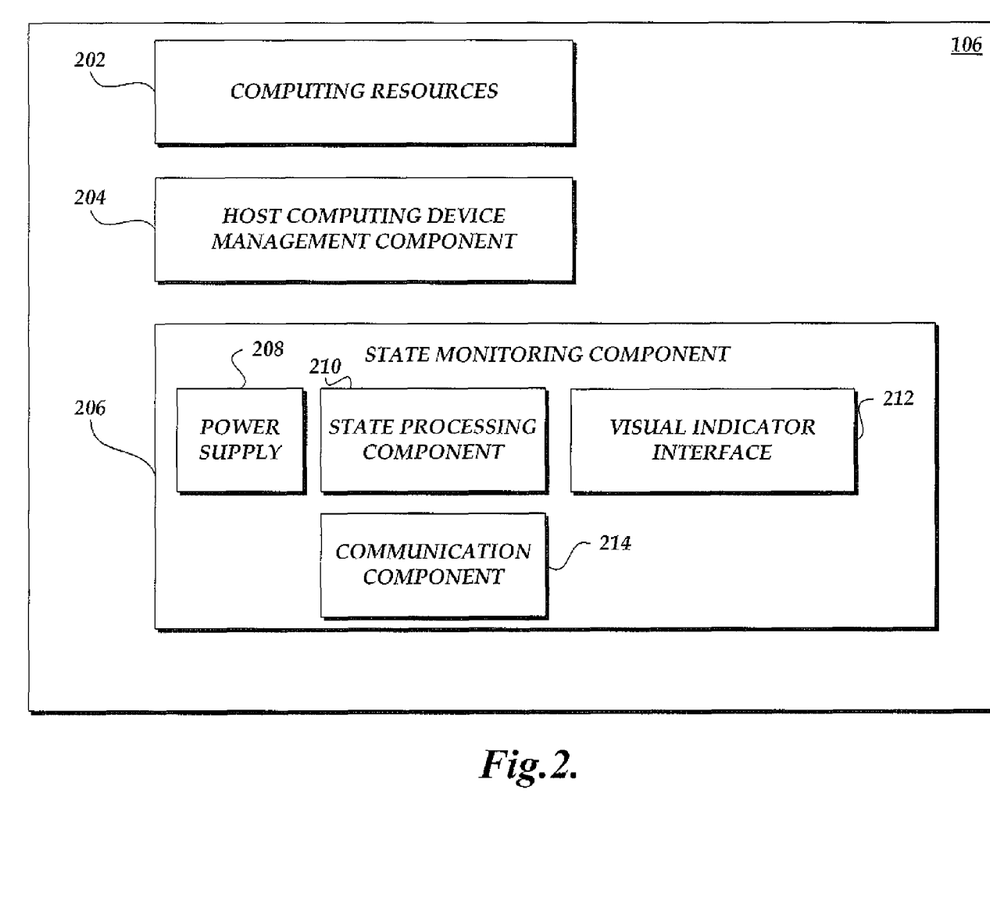
FIG. 2 is a block diagram illustrative of components of a control component for utilization in the environment for managing host computing devices of FIG. 1.

Turning now to FIG. 2, illustrative components of a host computing device control component 106 in the host computing device environment 100 will be described. In an illustrative embodiment, the host computing device control component 106 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. The content delivery environment 100 can include any of number and various kinds of host computing device control components 106, which may be customized according to specific racks 104 or types of racks.

Illustratively, the host computing device control component 106 may have varied local computing resources such as central processing units and architectures, memory, mass storage, graphics processing units, communication network availability and bandwidth, etc. Generally, however, each host computing device control component 106 may include various computing resources 202 that can include one or more processing units, such as one or more CPUs. The computing resources 202 may also include system memory, which may correspond to any combination of volatile and/or non-volatile storage mechanisms. The system memory may store information that provides an operating system component, various program modules, program data, or other components. The host computing device control component 106 performs functions by using the processing unit(s) to execute instructions provided by the system memory. The computing resources 202 may also include one or more input devices (keyboard, mouse device, specialized selection keys, touch screen interface, stylus, etc.) and one or more output devices (displays, printers, audio output mechanisms, etc.). The computing resources 202 may also include one or more types of removable storage and one or more types of non-removable storage. Still further, the computing resources can include hardware and software components for establishing communications over the communication network 108, such as a wide area network or local area network, or via an internal communication network connecting the set of host computing devices 102. For example, the host computing device control component 106 may be equipped with networking equipment and software applications that facilitate communications via the Internet or an intranet.

However, although various computing resources 202 have been identified, ones skilled in the relevant art will appreciate that various combinations of computing resources may be implemented on a host computing device control component 106 and that one or more of the identified computing resources may be optional.

As illustrated in FIG. 2, the host computing device control component 106 can include, among other hardware or software components, a management component 204 for facilitating management of the set of host computing devices 102. As discussed above, the management component 204 can facilitate various interactions with one or more of the set of host computing devices 102 including, but not limited to, provisioning, updating, monitoring, and modifying software associated with the host computing devices. Although the management component 204 is illustrated as a single component, one skilled in the relevant art will appreciate that the management component 204 may be made up of a number of components or subcomponents to carry out one or more management functions associated with the host computing device control component 106.

The host computing device control component 106 can also include a state monitoring component 206 for monitoring the state of the operation of the host computing device control component 106, communicating event information to other state monitoring components, and providing visual indicators corresponding to the determined state of operation. The state monitoring component 206 can include various components, or subcomponents (either hardware or software) for carrying out one or more of the functions of the state monitoring component. In one aspect, the state monitoring component 206 includes a power supply 208 for providing power to one or more components of the state monitoring component 206. Illustratively, the power supply 208 is independent of any power supply associated with the host computing device control component 106 such that a loss of power by the host computing device control component 106 does not result in a loss of power to the state monitoring component 206. For example, the power supply 208 may correspond to a battery or other capacitive device. The state monitoring component 206 can also include a state processing component 210 for determining an operating state of the rack control component based on one or more inputs provided to the state monitoring component 206 or based on a failure to receive inputs. The state monitoring component 206 can also determine various reboot parameters in the event of detection of a power event (e.g., a power outage or low power event) and initiate a reboot based on the reboot parameters.

The state monitoring component 206 can also include visual indicator interface component 212 for causing the generation of visual indicators, or other indicators, based on various determined operating states of the host computing device control component 106. In one embodiment, the visual indicator interface component 212 can include or be in direct communication with hardware for making the visual indications, including, but not limited to, liquid crystal displays ("LCD"), light emitting diodes ("LED"), sets of LCDs, sets of LEDs, multi-color LEDS, sets of multi-color LEDS and various combinations thereof. In another embodiment, the hardware for making the visual indications may be part of the computing resources 202 such that the visual indicator interface 212 is in communication (directly or indirectly) to cause the generation of various visual indicators as will be described below.

The state monitoring component 206 can further include a communication component 214 for establishing communications with other state monitoring components 206 or other reporting services as described in the present application. In an illustrative embodiment, the communication component 214 can include various hardware and software components utilized to exchange information via one or more communication paths. The communication paths can include wireless communication paths (via infrared, RF, optical, terrestrial, satellite communication media, etc.), wired communication paths, or a combination thereof. Although aspects of the present disclosure will be described with regard to an illustrative communication device environment and component interactions, communication protocols, flow diagrams and interfaces, one skilled in the relevant art will appreciate that the disclosed embodiments are illustrative in nature and should not be construed as limiting.

Figure 3A:
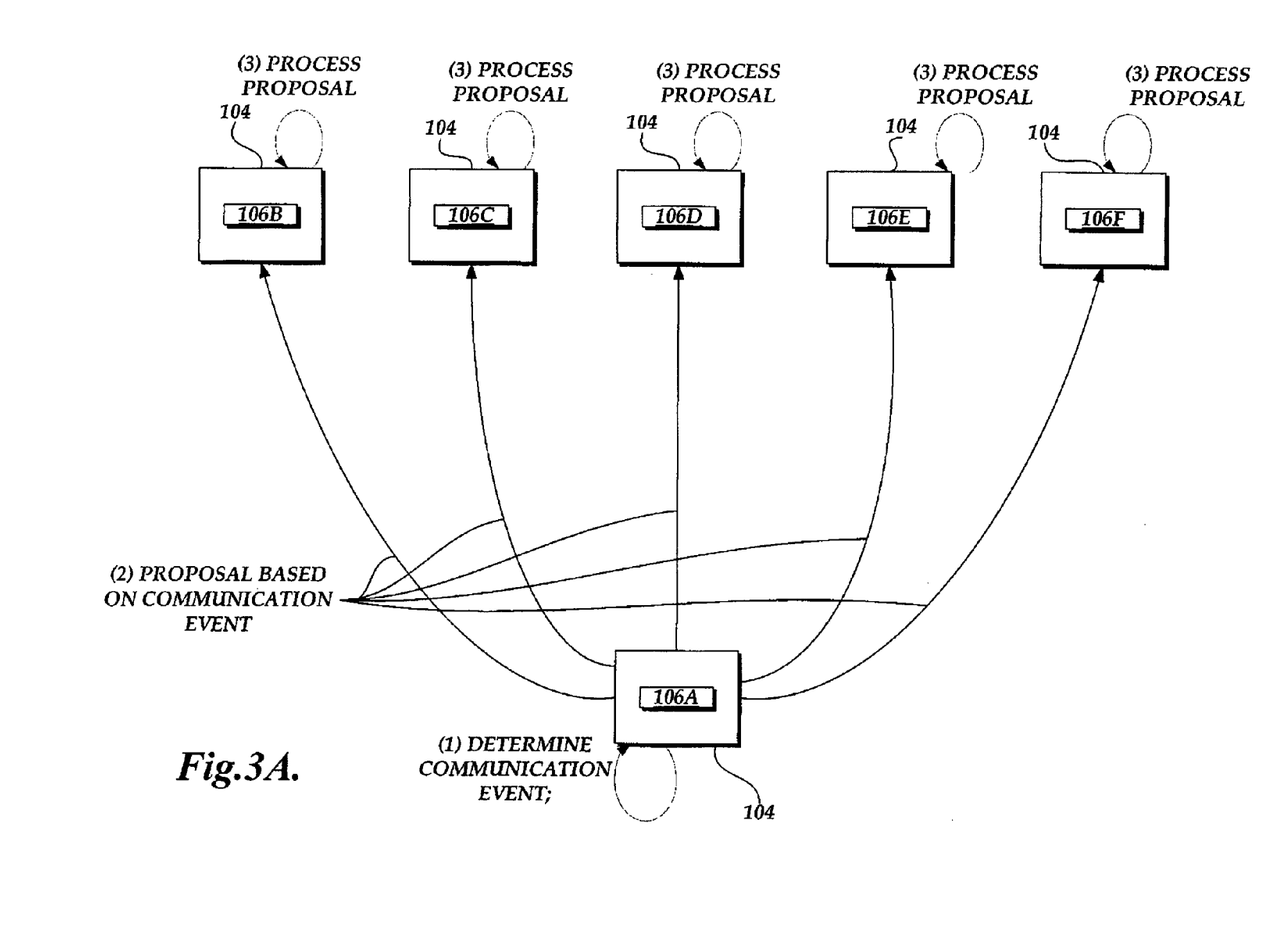
FIGS. 3A and 3B are block diagrams of the host computing device environment of FIG. 1 illustrating the processing of communication events and determination of communication event information in accordance with a consensus algorithm.
Figure 3B:
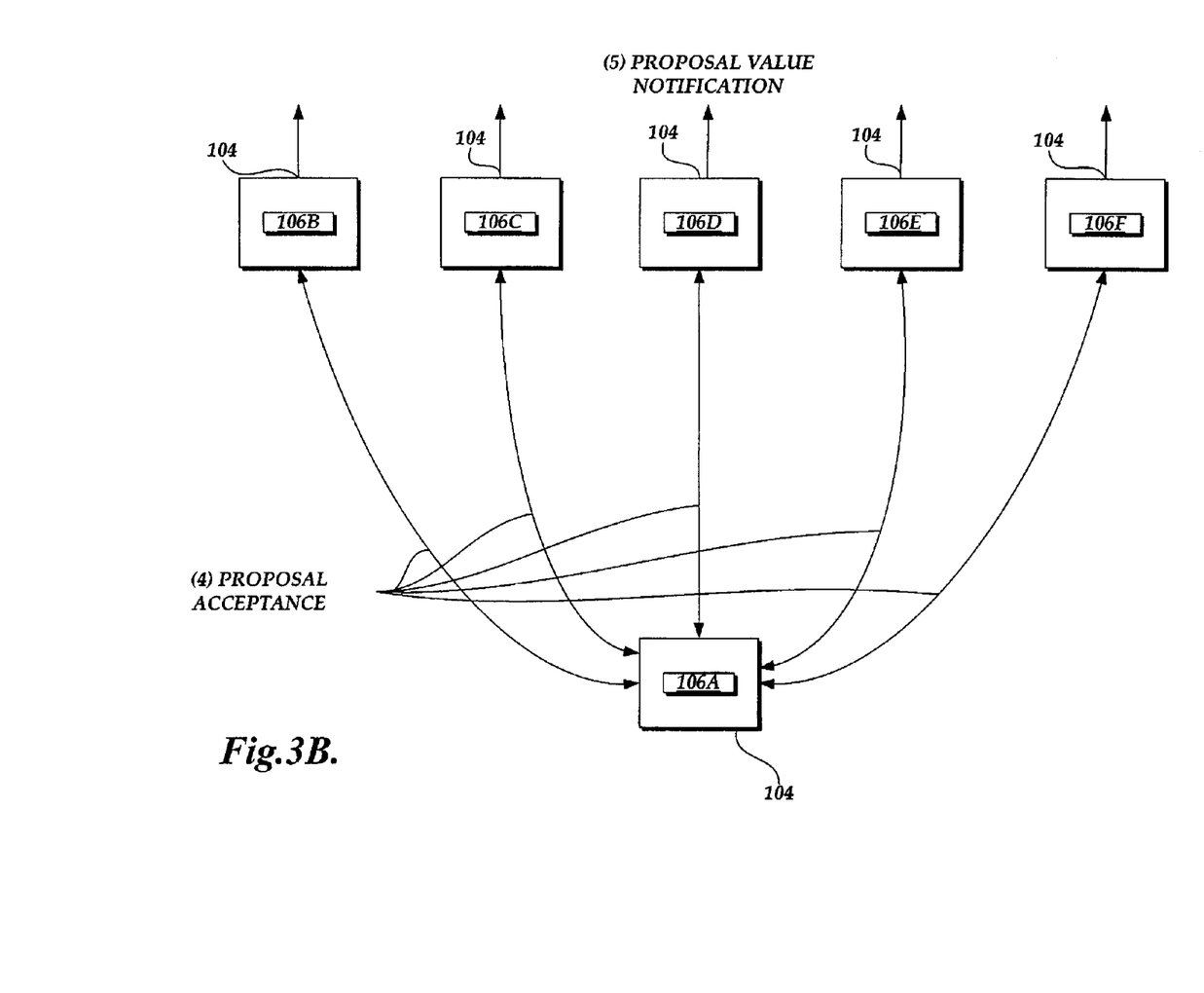

With reference now to FIGS. 3A and 3B various interactions between the components of the host computing device environment 100 will be described. For purposes of the illustrative embodiment, however, many of the components of the host computing device environment 100 have been omitted. Accordingly, one skilled in the relevant art will appreciate that additional or alternative components may be utilized in conjunction with the illustrated embodiments. With reference to FIG. 3A, the state monitoring component 206 of one or more host computing device control components 106 determines a communication event (1). Illustratively, a communication event can correspond to various faults or errors associated with the operation of individual host computing devices 102, grouping of host computing devices, or the host computing device control component 106. In another embodiment, the communication event can correspond to an exchange of status information without the occurrence of a fault or error.

In an illustrative embodiment, because the state monitoring component 206 of the host computing device control component 106 includes a separate power supply component 208, the state monitoring component 206 can continue to operate even if there is a disruption to the power supply provided to the host computing device control component 106 and set of host computing devices 102. Accordingly, the state monitoring component 206 then establishes an alternative network connection via the communication component 214. Illustratively, the state monitoring component 206 attempts to establish communication with one or more other state monitoring components. For example, the state monitoring component 206 can attempt to construct or join a mesh network made of up other state monitoring components. In this example, the state monitoring component 206 may utilize a short range wireless communication protocol to establish a network connection with one or more state monitoring components that are within a maximum range. Because the power available from the power supply 208 may be limited, the state monitoring component 206 may be operating on a low power, short range communication path. The alternative network connection can correspond to a portion of the communication network 108 utilized by the set of host computing devices 102 or a completely separate communication network isolated from any communication channel accessible to the host computing devices. In another embodiment, the state monitoring component 206 can continuously maintain the alternative network connection independent of whether a communication event has occurred.

In one embodiment, the state monitoring component 206 will implement a consensus algorithm, such as a Paxos algorithm, to transmit event information to other state monitoring components. In one embodiment, consensus based algorithm can be utilized to determine the condition of the grouping of host computing devices 102. If a consensus can be reached, the various state monitoring components accept the event information as valid. For example, the state monitoring components 206 can agree as to the state of the data centers (operational or nonoperational). In another example, the state monitoring components 206 can exchange control information related to the operation of host computing devices 102, such as whether to initiate a reboot of the host computing devices 102. In another embodiment, consensus based algorithms can be utilized to determine a state monitoring component that will be authoritative for the grouping of host computing devices 102. By way of illustration, state monitoring component 106A can propose to be authoritative for the grouping of host computing devices 102 corresponding to state monitoring components 106B, 106C, 106D, and 106E. If a consensus can be reached, the various state monitoring components accept the event information provided by the designated authoritative state monitoring component as valid In accordance with a consensus type algorithm, based on the determination of a communication event, the state monitoring component 206 transmits a request to a set of other state monitoring components with a proposal (2). As previously described, the proposal can correspond to a value for the event information that the transmitting state monitoring component 206 wants the receiving state monitoring component 206 to accept or a proposal for designation to be authoritative for the grouping of host computing devices.

Turning to FIG. 3B, in this illustrative embodiment, it is assumed that the state monitoring component 206 can establish communication with a minimum number of other state monitoring components to reach a consensus. If the receiving state monitoring components accept the proposal, the receiving state monitoring component and transmitting state monitoring component exchange additional information to finalize the acceptance of the proposal (4). Illustratively, the exchange of information can correspond to a number of exchanges between the receiving and the transmitting state monitoring components. Once the receiving state monitoring components have accepted a value, the same state monitoring components can transmit the accepted values to other state monitoring components (5).

Figure 4A:
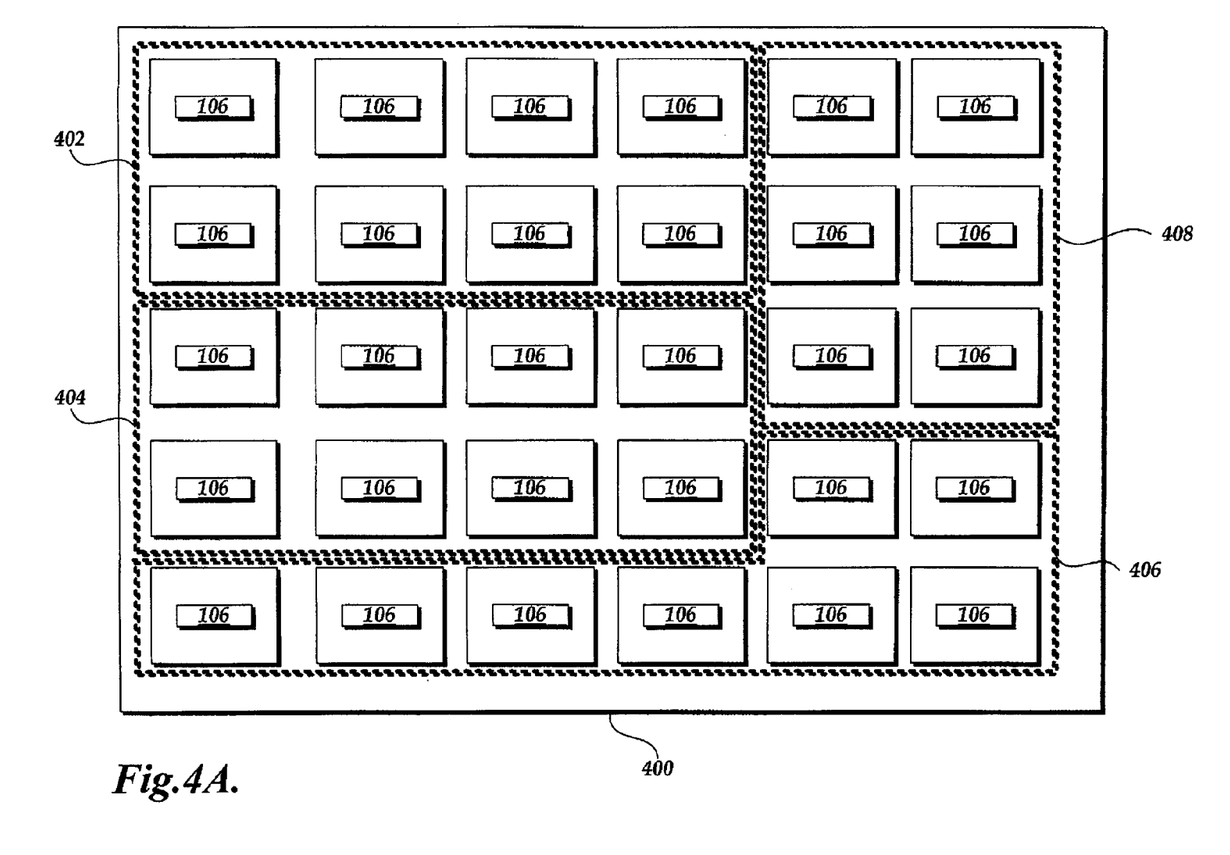
FIGS. 4A-4C are block diagrams of the host computing device environment of FIG. 1 illustrating a hierarchical exchange of event information in accordance with a consensus algorithm.
Figure 4B:
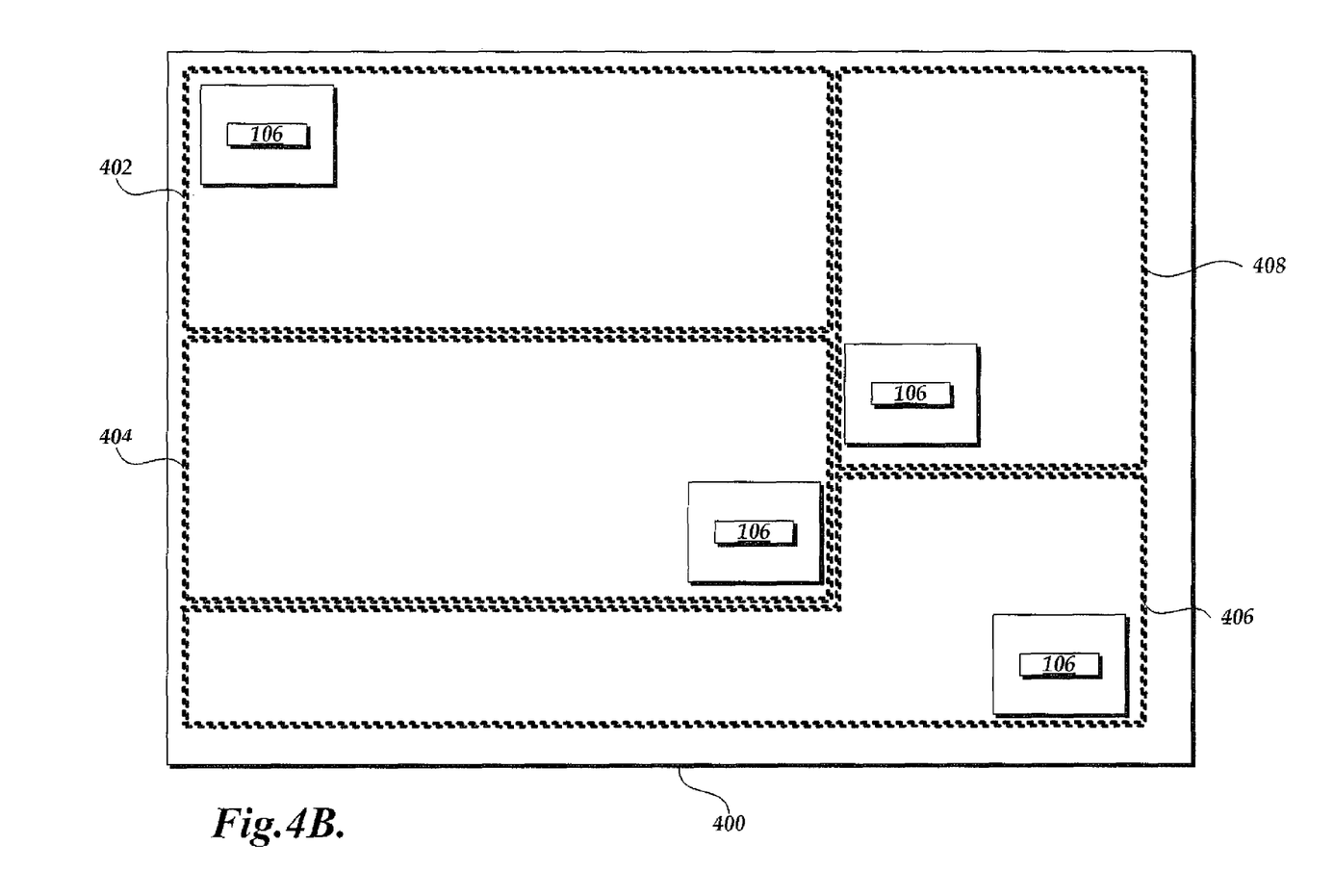
Figure 4C:
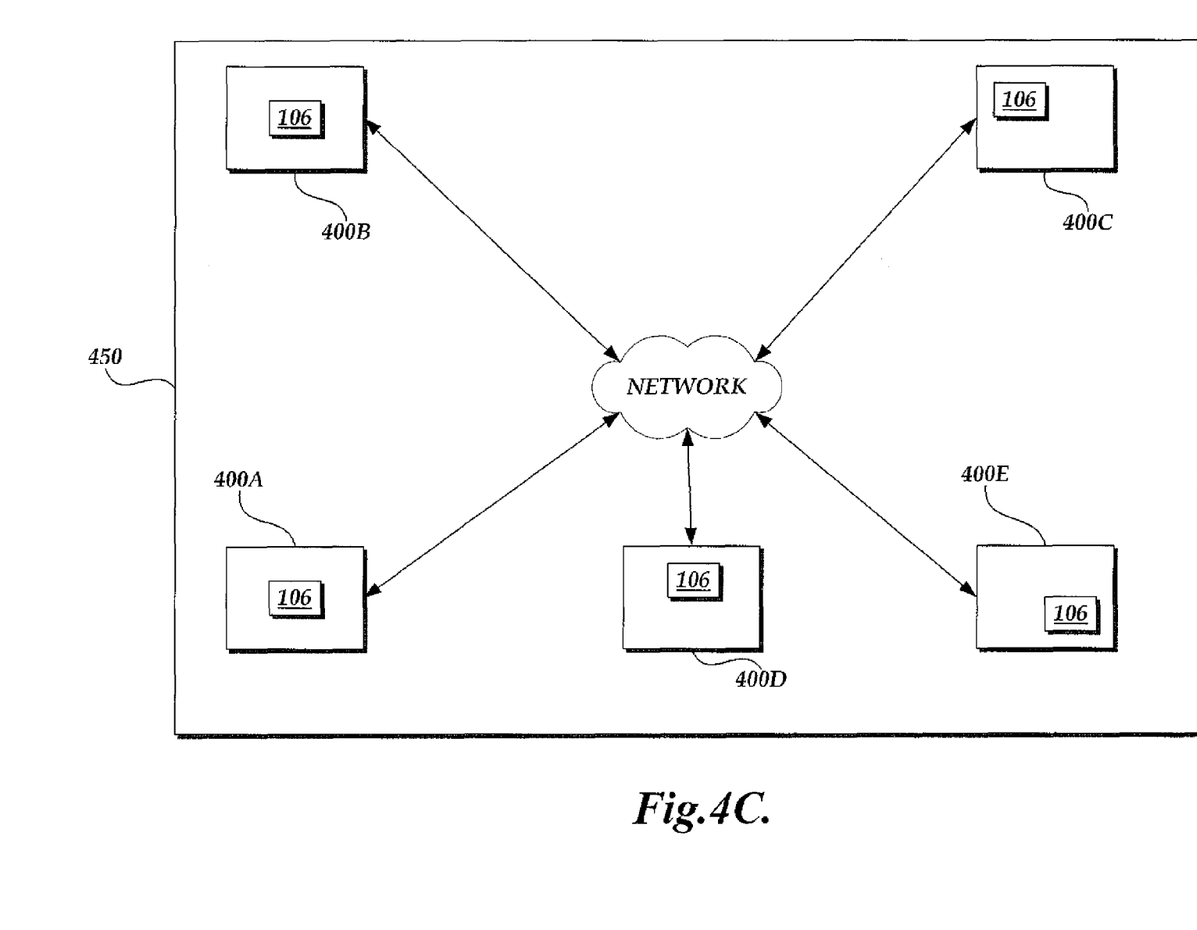

Referring now to FIGS. 4A-4C, the above interaction between the state monitoring components can be implemented multiple times in a hierarchical approach. For example, a state monitoring component can implement a consensus algorithm among a subset of state monitoring components with a data center to arrive at an accepted value. With reference to FIG. 4A, a data center 400 may be subdivided into multiple sectors 402, 404, 406, and 408. The state monitoring components within each sector of the data center can arrive at a consensus for a value. The same state monitoring components can then implement the consensus algorithm to arrive at an accepted value for all the state monitoring components in a data center. With reference to FIG. 4B, designated state monitoring components in each sector can implement that consensus algorithm to determine an accepted value for the data center. Still further, the same state monitoring components can then implement the consensus algorithm to arrive at an accepted value between various data centers (which have also implemented the consensus algorithm). With reference to FIG. 4C, a state monitoring component in each data center 400A-400E can utilize the consensus algorithm to arrive at the accepted value.

Figure 5:
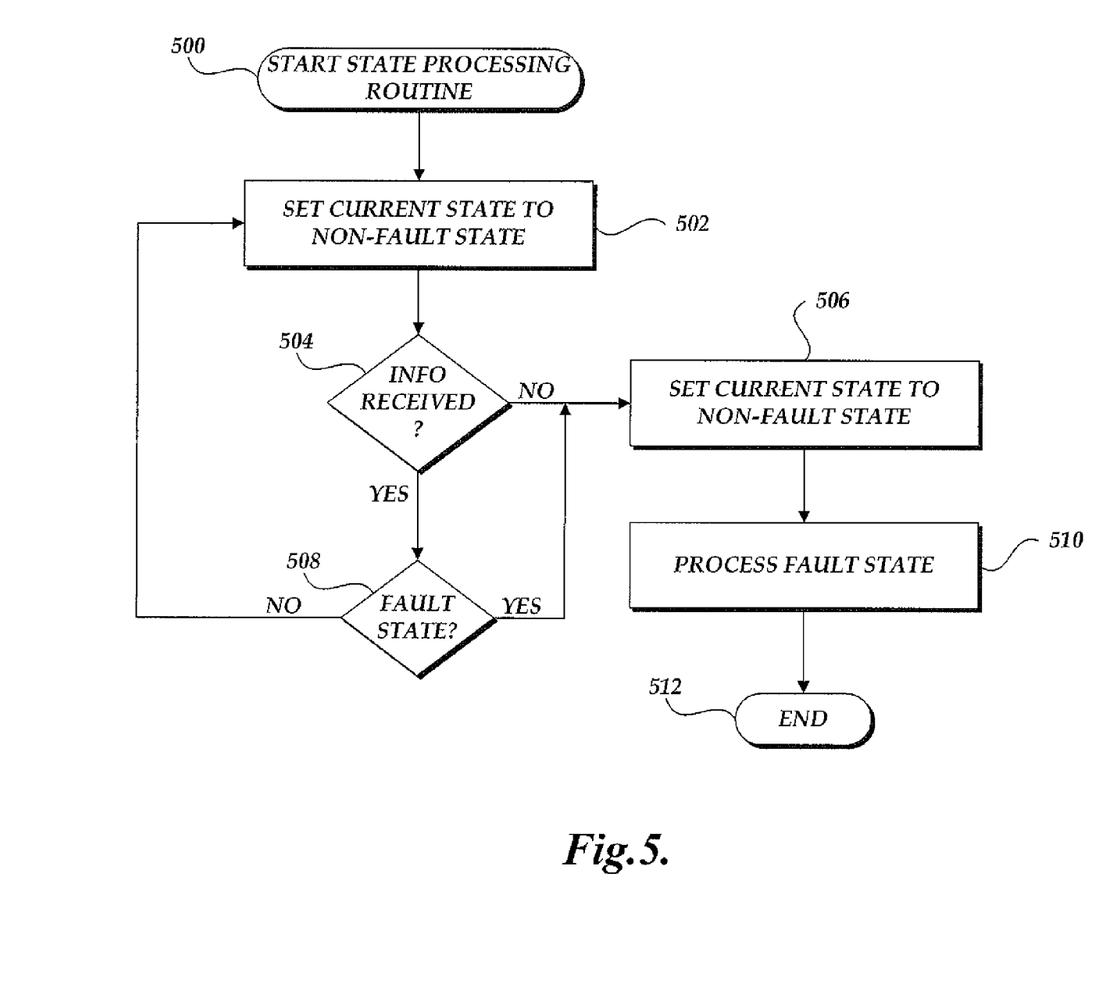
FIG. 5 is a flow diagram illustrative of a control component operating state processing routine implemented by a state monitoring component.

Referring now to FIG. 5, a flow diagram illustrative a control component operating state processing routine 500 will be described. For purposes of illustration, routine 500 will be described as implemented by a state monitoring component 206. However, one skilled in the art will appreciate that routine 500 may be implemented, at least in part, by other components of the host computing device environment 100. In one aspect, the state monitoring component 206 can maintain a default condition that corresponds to a non-fault determination for the host computing device control component 106. If the state monitoring component 206 obtains information associated with the function of the host computing device control component 106, the state monitoring component 206 can determine whether to modify the default state based on the information obtained from the host computing device control component 106. Additionally, if the state monitoring component 206 does not receive any information, it can determine whether to modify the default condition.

At block 502, the state monitoring component 206 sets the current state to a non-fault state. At decision block 504, the state monitoring component 206 determines whether it has received information regarding the operation of aspects of the host computing device environment 100 (which may be exchanged via the consensus algorithm). Illustratively, the information regarding the operation of the host computing device control component 106 can include information regarding processor performance, operating system performance, network performance or power performance information. In one embodiment, the host computing device control component 106 can be configured to transmit the information to the state monitoring component 206. In another embodiment, the state monitoring component 206 can poll the host computing device control component 106 to obtain the information.

If at decision block 504, the state monitoring component 206 determines that it has not received information regarding a fault condition, the state monitoring component 206 sets the current state to a fault condition at block 506. In this embodiment, the failure to receive information from the host computing device control component 106 can be interpreted as a fault condition. The routine 500 then proceeds to block 510, which will be described below.

Referring again to decision block 504, if the state monitoring component 206 had received information regarding the operation of aspects of the host computing device environment 100, the state monitoring component 206 processes the information to determine whether a fault condition exists at decision block 508. Illustratively, the processing of the information associated with the operation of aspects of the host computing device environment 100 correspond to a comparison of one or more thresholds that establish the presence of fault conditions. If at decision block 508, the processing of the information regarding the operation of aspects of the host computing device environment 100 is indicative of no faults, the routine 500 returns to block 502.

If at decision block 508, the processing of the information regarding the operation of aspects of the host computing device environment 100 is indicative of a fault condition, the routine 500 proceeds to block 506 where the state monitoring component 206 sets the current state to a fault state. At block 510, the state monitoring component 206 processes the fault condition. Illustratively, the state monitoring component 206 can generate one or more visual indicators based on the determined fault condition. In one embodiment, the state monitoring component 206 can utilize a single visual indicator for any fault condition. In another embodiment, the state monitoring component 206 can utilize multiple visual indicators based on a type of fault condition. For example, the state monitoring component 206 can associate a first color indicator for a fault condition indicative of needed repair fault state and a second color indicator for a fault condition indicative of a troubleshooting fault state. In a further embodiment, the state monitoring component 206 can associate a separate indicator, such as a flashing indicator, that can be associated with a power off condition for the host computing device control component 106. One skilled in the relevant art will appreciate that additional or alternative visual indicators may be implemented. At block 512, the routine 500 terminates.

Figure 6:
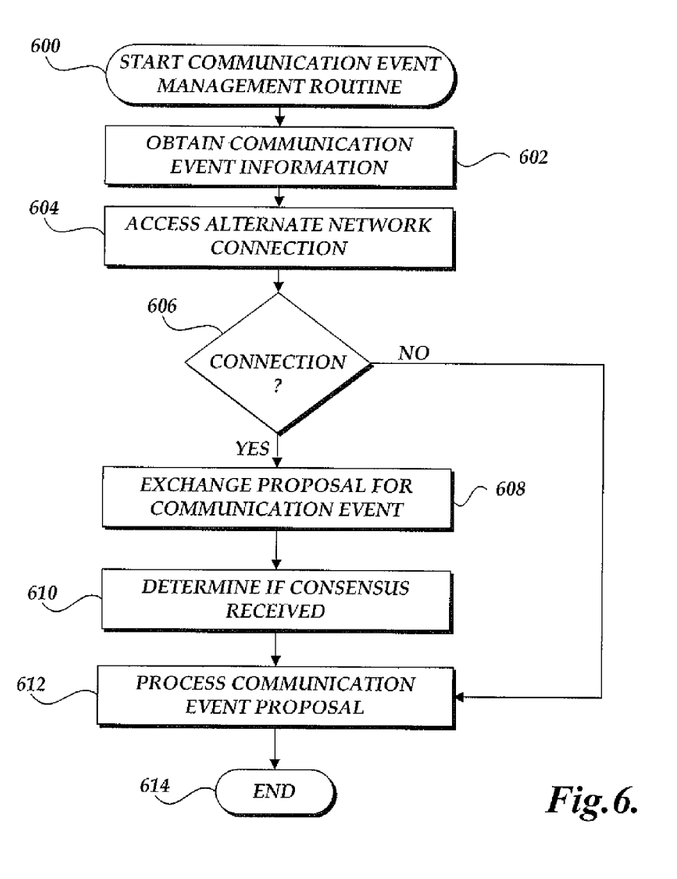
FIG. 6 is a flow diagram illustrative of an event management routine implemented by a state monitoring component.

Turning now to FIG. 6, a event management routine 600 implemented by a state monitoring component 206 for processing event information will be described. Although routine 600 will be described with regard to managing events related to any one of a number of factors associated with the set of host computing devices 102 or the host computing device control component 106, routine 600 may be implemented with regard to the management of other events related to resource usage or resource availability by the set of host computing devices. At block 602, the state monitoring component 206 obtains communication event information and determines a communication event has occurred. As previously described, the communication event can correspond to a determination of errors or faults in the set of host computing devices 102. Alternatively, the communication event can correspond to an exchange of information independent of any determination of errors or faults in the set of host computing devices 102.

At block 604, the state monitoring component 206 attempts to communicate with one or more other state monitoring components via the alternate network connection. In an illustrative embodiment, if a power event (or other event) has been determined, the state monitoring component 206 can assume that the communication network 108 utilized by the set of host computing devices 102 is unavailable or unreliable. Accordingly, the state monitoring component 206 utilizes the communication component 214 to attempt to contact other state monitoring components. As previously described, the alternative network connection corresponds to one or more communication paths, including wireless communication paths (via infrared, RF, optical, terrestrial, satellite communication media, etc.), wired communication paths, or a combination thereof. In one embodiment, if a communication channel has not been previously established, the state monitoring component 206 can attempt to create a new communication channel. Alternatively, the state monitoring components 206 may continuously exchange information via an alternative communication path for purposes of keeping the communication path available or otherwise exchange information.

At decision block 606, a test is conducted to determine whether the state monitoring component 206 has established a connection or is otherwise in communication (based on a pre-existing communication channel) with at least one other state monitoring component. If not, the routine 600 proceeds to block 612, which will be described in greater detail below. Alternatively, if at decision block 606, the state monitoring component 206 is able to establish a connection or access an existing connection with at least one other state monitoring component, at block 608, the state monitoring component 206 transmits a proposal for acceptance of event information. Illustratively, the proposal for acceptance of event information can correspond to a consensus acceptance of a condition for the grouping of host computing devices 102, such as a power level or state, network level or state, and the like. In another embodiment, the proposal for acceptance of event information corresponds to a proposal for a state monitoring component 206 to be designated as authoritative for the grouping of host computing devices 102. In this embodiment, once a state monitoring component has been accepted as authoritative for the grouping of host computing devices, all information related to the a condition for the grouping of host computing devices will be considered as true or accepted by the group.

At block 610, the state monitoring component 206 determines if a consensus has been reached for the state monitoring components 206 that have received the proposal. If a consensus cannot be reached, the value is not accepted. At block 612, if the value is not accepted or a consensus is not reached, in one embodiment, the state monitoring component 206 does not do anything or reverts to another value. For example, the state monitoring component 206 may assume that the other data centers are not functioning. Alternatively, at block 612, if a consensus has been reached, the state monitoring component 206 considers the value to be accepted. At block 614, the routine 600 terminates.

Figure 7:
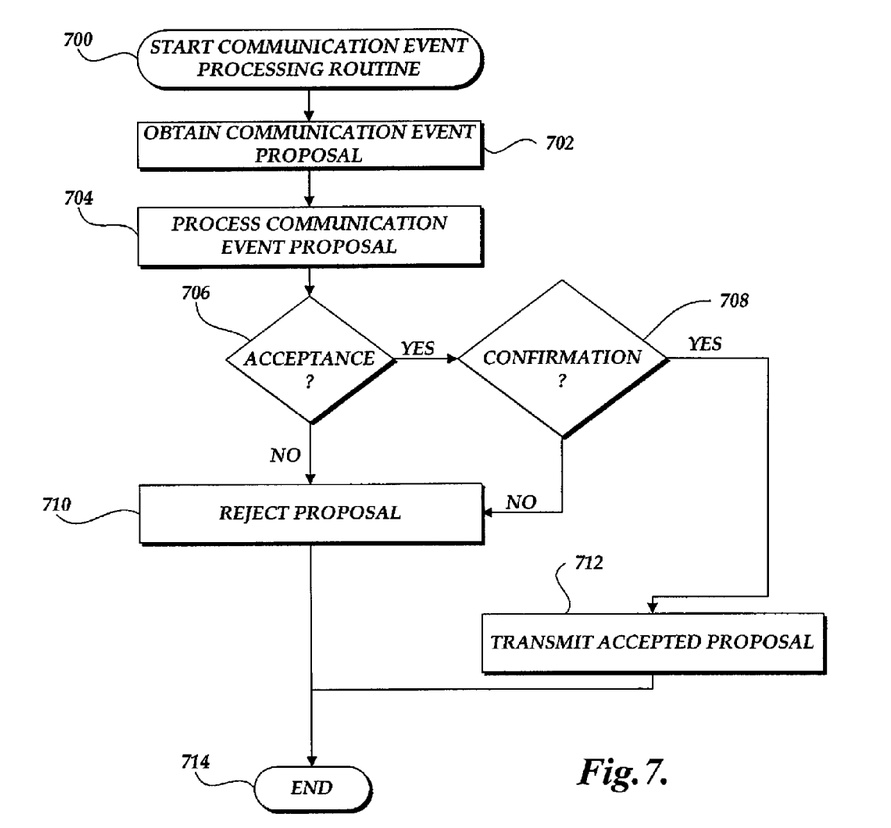
FIG. 7 is a flow diagram illustrative of an event subroutine implemented by a state monitoring component.

Turning now to FIG. 7, a communication event processing subroutine 700 implemented by a state monitoring component 206 for processing event information will be described. At block 702, the state monitoring component 206 obtains event information from a transmitted state monitoring component 206. At block 704, the receiving state monitoring component 206 processes the received event information. As previously described, a received state monitoring component 206 can receive multiple proposals for a value. In embodiments in which a condition of the grouping is being proposed, the receiving state monitoring component 206 will accept only the proposal with the highest value or most recent value. In other embodiments, the proposal being provided corresponds to designation of the state monitoring component 206 to be designated as authoritative for purposes of deciding the condition associated with the grouping of host computing devices 102. At decision block 706, the state monitoring component 206 determines whether it will accept the received proposal. If so, at decision block 708, the state monitoring component 206 then determines whether it has received a confirmation from the transmitting the state monitoring component 206.

If the state monitoring component 206 does not accept the proposal at decision block 706 or if a confirmation is not received at decision block 708, at block 710, the proposal is rejected. Alternative, if the proposal is accepted and confirmation is received, the state monitoring component 206 can then transmit the accepted value to other state monitoring component 206 at block 712. At block 714, the routine 700 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing a plurality of subsets of host computing devices, the system comprising:
   a first control component in communication with a first subset of a plurality of subsets of host computing devices and in communication with other control components of the plurality of subsets of host computing devices, the control component including:
   a first state monitoring component configured to determine communication event information that corresponds to a first state of operation, the first state of operation being associated with at least one host computing device in the first subset; and
   a communication interface for establishing communication with other state monitoring components;
   wherein the first state monitoring component implements a consensus based algorithm with another state monitoring component that monitors a state of a different subset of the plurality of subsets, and wherein the implementation of the consensus based algorithm designates a state monitoring component authoritative for one or more of the plurality of subsets.

2. The system as recited in claim 1, wherein the state monitoring component authoritative for the one or more of the plurality of subsets is caused to implement the consensus based algorithm with an additional state monitoring component authoritative for an additional subset to determine a state monitoring component authoritative for the one or more of the plurality of subsets and the additional subset.

3. The system as recited in claim 2, wherein the one or more of the plurality of subsets correspond to host computing devices in a first data center and wherein the additional subset corresponds to host computing devices in a second data center.

4. The system as recited in claim 1, wherein the first state monitoring component transmits a proposal to designate an authoritative state monitoring component for implementing the consensus based algorithm with other state monitoring components of the plurality of subsets of host computing devices.

5. The system as recited in claim 4, wherein the proposal to designate the authoritative state monitoring component is approved when a minimum number of state monitoring components accept the proposal.

6. The system as recited in claim 1 further comprising a management component for managing operation of host computing devices in the first subset of the plurality of subsets, wherein the management component is associated with a power supply and wherein the first state monitoring component is associated with a power supply that is independent from the power supply of the management component.

7. The system as recited in claim 1, wherein the first and the another state monitoring components communicate with each other via a communication channel independent of another communication channel associated with host computing devices in the first subset and the different subset.

8. A computer implemented method for managing a plurality of subsets of host computing devices, the method comprising:
under control of one or more processors configured with specific executable instructions for implementing a first state monitoring component for monitoring a state of a first subset of a plurality of subsets of host computing devices,
determining communication event information that is associated with a first state of operation attributed to a first subset of the plurality of subsets of host computing devices;
iteratively causing communications with a second state monitoring component that determines a second state of operation attributed to a second subset of the plurality of subsets of host computing devices; and
implementing a consensus based algorithm with the second state monitoring component for designating a state monitoring component that is authoritative for determining a state of operation associated with the first and second subsets of the plurality of subsets of host computing devices based on the first state of operation and the second state of operation.

9. The computer implemented method as recited in claim 8, wherein the state monitoring component authoritative for determining the state of operation associated with the first and second subsets is caused to implement the consensus based algorithm, with a third state monitoring component authoritative for a third subset of the plurality of subsets, for designating a state monitoring component authoritative for determining a state of operation for the first, second and third subsets.

10. The computer implemented method as recited in claim 9, wherein the first and second subsets of the plurality of subsets correspond to host computing devices in a first data center and wherein the third subset of the plurality of subsets correspond to host computing devices in a second data center.

11. The computer implemented method as recited in claim 8, wherein implementing the consensus based algorithm includes transmitting a proposal to designate an authoritative state monitoring component with other state monitoring components of the plurality of subsets of host computing devices.

12. The computer implemented method as recited in claim 11, wherein the proposal to designate the authoritative state monitoring component is approved when a minimum number of state monitoring components accept the proposal.

13. The computer implemented method as recited in claim 8, wherein the first and the second state monitoring components communicate with each other via a communication channel independent of another communication channel associated with host computing devices in the first and the second subsets.

14. A state monitoring component for monitoring host computing devices, the state monitoring component comprising:
one or more processors;
a power supply;
a state processing component for determining event information associated with at least one host computing device in a first subset of a plurality of subsets of host computing devices; and
a communication interface for communicating with other state monitoring components of other subsets of the plurality of subsets;
wherein the state monitoring component communicates with a second state monitoring component regarding the event information determined by the state processing component to implement a consensus based algorithm for designating a state monitoring component authoritative for determining a state of operation associated with the first and second subsets of the plurality of subsets of host computing devices based on the event information determined by the state processing component.

15. The state monitoring component as recited in claim 14, wherein the state monitoring component authoritative for determining the state of operation associated with the first and second subsets is caused to implement the consensus based algorithm, with a third state monitoring component authoritative for a third subset of the plurality of subsets, for designating a state monitoring component authoritative for determining a state of operation associated with the first, second and third subsets.

16. The state monitoring component as recited in claim 14, wherein the first and second subsets of the plurality of subsets correspond to host computing devices in a first data center and wherein the third subset of the plurality of subsets correspond to host computing devices in a second data center.

17. The state monitoring component as recited in claim 14, wherein the state monitoring component transmits a proposal to designate an authoritative state monitoring component for implementing the consensus based algorithm with other state monitoring components of the plurality of subsets of host computing devices.

18. The state monitoring component as recited in claim 14, wherein the proposal to designate the authoritative state monitoring component is approved when a minimum number of state monitoring components accept the proposal.

19. The state monitoring component as recited in claim 14, wherein the state monitoring component communicates with the second state monitoring component via a communication channel independent of another communication channel associated with host computing devices in the first and the second subsets.

20. The state monitoring component as recited in claim 14, wherein the power supply is independent of a power supply associated with host computing devices of the first subset of the plurality of subsets of host computing devices.

\* \* \* \* \*